United States Patent [19]

Muller et al.

[11] Patent Number: 4,714,392
[45] Date of Patent: Dec. 22, 1987

[54] SELF-LOCKING SHEET-METAL NUT

[75] Inventors: Klaus Muller, Weil-Haltingen; Bernd Mutz, Schopfheim; Helmo Daler, Lorrach, all of Fed. Rep. of Germany

[73] Assignee: A. Raymond, Lorrach, Fed. Rep. of Germany

[21] Appl. No.: 917,484

[22] Filed: Oct. 10, 1986

[30] Foreign Application Priority Data

Oct. 12, 1985 [DE] Fed. Rep. of Germany ....... 3536473

[51] Int. Cl.⁴ ...................... F16B 37/02; F16B 37/04
[52] U.S. Cl. ..................................... 411/175; 411/524
[58] Field of Search ............... 411/174, 175, 288, 290, 411/291, 437, 522–524, 525–527

[56] References Cited

U.S. PATENT DOCUMENTS

| Re. 21,769 | 4/1941 | Tinnerman | 411/524 |
| Re. 22,049 | 3/1942 | Tinnerman | 411/524 |
| 2,771,113 | 11/1956 | Flora | 411/175 |
| 3,308,708 | 3/1967 | Holton . | |
| 4,508,477 | 4/1985 | Oehlke et al. | 411/174 |

Primary Examiner—Neill Wilson
Attorney, Agent, or Firm—Finnegan, Henderson, Farabow, Garrett & Dunner

[57] ABSTRACT

A self-locking sheet-metal nut having a generally flat leg with an embossed thread portion for receipt of a screw and a pair of locking tabs resiliently and integrally connected to one end of said leg that extend over and are spaced from the leg. The tabs are approximately perpendicular to the axis of the screw and have clamping edges which are directed toward each other and form an opening downstream of the embossed thread portion that is smaller than the core diameter of the screw to be threaded into the nut. Upon turning of a screw through the nut, the clamping edges are forced apart and resiliently grip the core of the screw to lock it in place.

7 Claims, 7 Drawing Figures

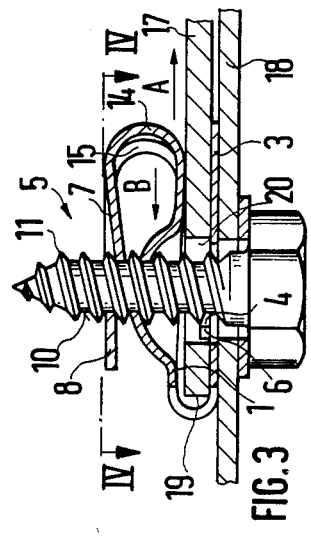
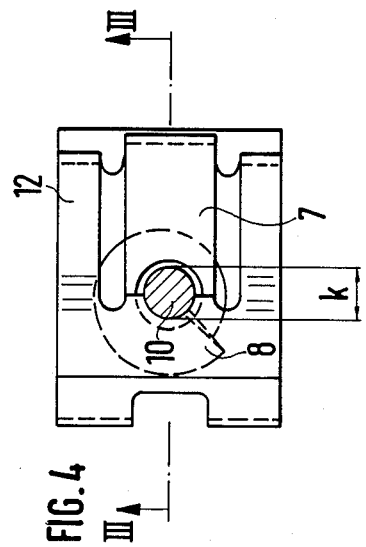
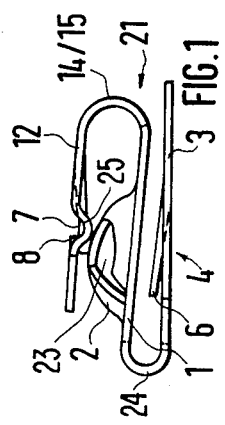
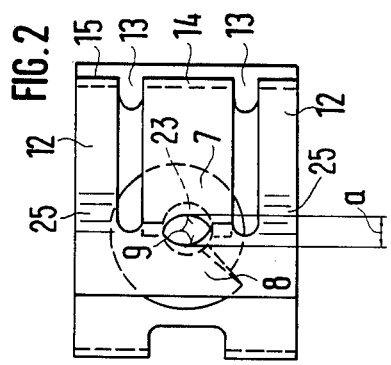

SELF-LOCKING SHEET-METAL NUT

BACKGROUND OF THE INVENTION

This invention relates to a clip-like and self-locking sheet-metal nut. Sheet-metal nuts of this type are typically used to fasten or hold together, in combination with a sheet-metal screw, flat plates, such as, for example, flat pieces of sheet-metal. In this connection, the nuts are made so that they bear against the threaded core of the screw with a spring force that prevents the screw from working loose through shocks or vibrations, that may occur, for example, in a motor vehicle.

Such a sheet-metal nut is shown, for example in U.S. Pat. No. 3,308,708. This sheet-metal nut has a helical slot that is adapted to engage the helical thread of the screw and a pair of resilient fingers integral with the portion of the nut forming the helical slot that curve upwardly and inwardly and are bent over to such an extent that curved clamping edges at their free ends are at a smaller distance from one another than the core diameter of the screw to be screwed into the nut. When the screw is screwed in, the edges of the fingers are pushed apart, with the fingers springing up over the entire length as far as they engage with the threaded leg of the screw and pressing inwardly against the core of the screw to keep it in place.

These fingers, however, are relatively weak because they bend over their entire length and therefore do not always provide the required clamping force desired. It has also been shown that the clamping force tends to weaken after repeated slackening, so that these sheet-metal nuts can only be re-used to a limited extent.

SUMMARY OF THE INVENTION

An object of the invention therefore is to provide locking tabs for a self-locking sheet-metal nut that provide a uniform and constant clamping force even after the screw has been screwed in and out of the nut repeatedly.

This object is achieved in accordance with the present invention by providing a self-locking, sheet-metal nut comprising a generally flat thread leg having an embossed thread portion with an aperture therein for receipt of a threaded member and a pair of locking tabs resiliently and integrally connected to one end of said leg that extend over and are spaced from the aperture, said tabs being approximately perpendicular to the axis of the threaded member and having clamping edges which are directed toward each other from opposite sides of the aperture and that form an opening downstream of the aperture smaller than the core diameter of the threaded member to be threaded into the nut, whereby upon turning of said threaded member through said aperture the clamping edges are forced apart and resiliently grip the core of the member to lock it in place.

BRIEF DESCRIPTION OF THE DRAWINGS

The drawings show two preferred embodiments of the invention, which are described in greater detail below, in which:

FIG. 1 is a side view of one embodiment of the sheet-metal nut of this invention;

FIG. 2 is a plan view of the sheet-metal nut of FIG. 1;

FIG. 3 is a side view, partially in section, of the sheet-metal nut in assembled condition taken along the line III—III of FIG. 4;

FIG. 4 is a plan view of the assembled sheet-metal nut of FIG. 3 looking in the direction of arrows IV—IV;

DETAILED DESCRIPTION OF THE INVENTION

Figure 5:
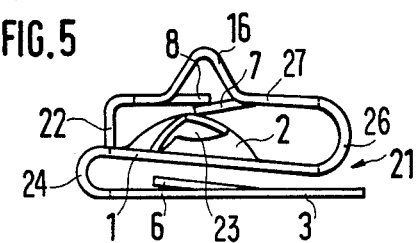
FIG. 5 is a side view of a further embodiment of the sheet-metal nut of the invention.
Figure 7:
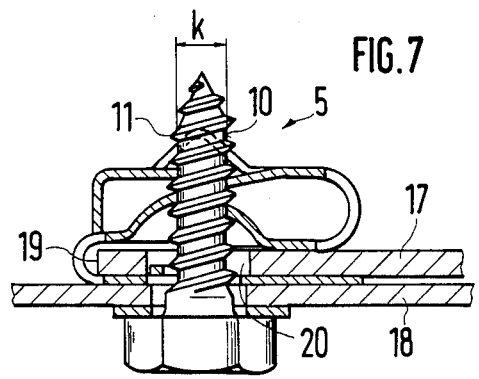
FIG. 7 is a side view, partially in section, of the sheet-metal nut in assembled condition.

As is apparent from FIGS. 3 and 7, the sheet-metal nut of the present invention is primarily used for connecting together plate-like components 17 and 18. As best shown in FIGS. 1 and 5, the nut consists essentially of a thread leg 1 having an embossed thread portion 2 containing a screw receiving aperture 23 of generally helical shape and a generally parallel clip leg 3 which is connected through a U-shaped member 24 to thread leg 1. Clip leg 3 has a through hole 4 for guiding through it a sheet-metal screw 5 which can be screwed into the helical aperture 23 in embossed thread portion 2. Thread leg 1 is generally flat and is slightly inclined toward clip leg 3 as shown in FIGS. 1 and 5 so that, when the sheet-metal nut is pressed onto the edge 19 of a backing plate 17, thread leg 1 will be bent up slightly and backing plate 17 will be firmly clamped between thread leg 1 and clip leg 3. Through hole 4 is encircled by a centering ring 6 which locks into a corresponding hole 20 in backing plate 17 when the sheet-metal nut is pressed onto the plate.

In the embodiment of FIGS. 1 to 4, the sheet-metal nut has a pair of opposed locking tabs 7 and 8 that are integrally connected to one side of thread leg 1 by U-shaped connecting bends 14 and 15, respectively, and that extend around toward and over the downstream side of embossed thread portion 2. Tabs 7 and 8 have semi-circular curved clamping edges 9 forming an oval opening smaller than aperture 23, as shown in FIG. 2, which, when the sheet-metal screw 5 is screwed into thread portion 2, come into tight contact against the thread core 10 of screw 5 from both sides and are pushed apart by the screw as it is threaded into the nut. This creates at the same time in connecting bends 14 and 15, a resilient clamping force that presses the edges 9 against screw 5 to prevent it from working loose. The distance "a" between the edges 9, in the initial condition of the sheet-metal nut, must of course be smaller than the core diameter "k" of the screw 5 so that an adequate clamping force can be produced.

Both locking tabs 7 and 8 are integrally connected to one side of the embossed thread portion 2, namely on the end 21 of thread leg 1, which end 21 is the front end of the nut when it is pushed onto plate 17. In this embodiment one tab 7 is integrally connected to the central part of leg 1 and engages the screw from that side of the nut. Tab 8, on the other hand, engages the opposite side of the screw and is connected to the front end 21 of the leg 1 via two webs 12 which extend past the opening between the clamping edges 9. As best shown in FIG. 2, webs 12 run parallel to tab 7 and are each separated from the latter by a narrow slot 13. Slots 13 extend down as far as the leg 1 in order to fully utilize the reslient effect of the U-shaped connecting bends 14 and 15. To ensure uniform yielding of locking tabs 7 and 8 as screw 5 is threaded into the nut, webs 12 and their connecting bends 15 together preferably have the same width as tab 7 and its connecting bend 14.

Both tabs 7 and 8, as well as webs 12, lie approximately in a plane perpendicular to the axis of screw 5. A dimple 25 on the underside of webs 12 that rests against the top of thread portion 2 helps to keep tabs 7 and 8 in this position. Consequently, tab 7, up to the beginning of bend 14, will be only subjected to a compressive stress, and the webs 12, up to the same location of bends 15, will be only subjected to a tensile stress, whereas the bends 14 and 15 will be subjected to a bending stress. As is apparent from FIGS. 3 and 4, the center bend 14 of tab 7 will be pressed outward to the right when screw 5 is screwed in in the direction of arrow A, whereas the two outer bends 15 will be pulled to the left in the direction of arrow B, in each case by half the amount by which the distance "a" between the semi-circular edges 9 in the unloaded condition is smaller than the core diameter "k" of screw 5.

In this way, the locking tabs are pushed away from the screw core when the screw is screwed in a direction approximately perpendicular to the screw axis so that there will be essentially no deformation of the locking tabs over their entire length as in the past, but essentially only in the curved connecting areas between the tabs and the thread leg. Rather center tab 7 and the two outer webs 12 connecting tab 8 to thread leg 1 will only be subjected to compressive or tensile stress.

Figure 6:
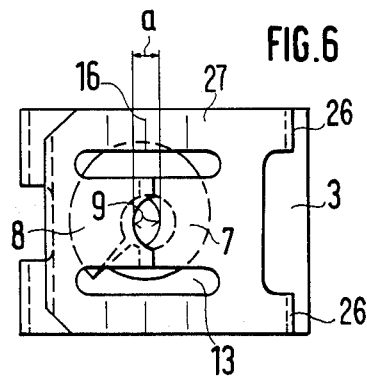
FIG. 6 is a plan view of the sheet-metal nut of FIG. 5.

In the embodiment shown in FIGS. 5–7, locking tab 7 is connected to leg 1 by a pair of connecting bends 26, while tab 8 is integrally connected to tab 7 by a pair of webs 27 that include a dimpled or corrugated deflection portion 16. Connecting bends 26 preferably have the same width as webs 27. Moreover, locking tab 8 preferably has an angled end piece 22 that spaces it from and supports it on thread leg 1.

As is apparent from FIGS. 6 and 7, locking tab 7 (on the right hand side in the drawings), is displaced toward the push-on side of the nut when screw 5 is screwed in by one-half the difference between the distance "a" between the edges 9 of tabs 7 and 8 and the thread core diameter "k" by resilient yielding of connecting bends 26, while tab 8 on the opposite side is, at the same time, displaced by the same amount in the opposite direction. In this embodiment the corrugated portion 16 extends in length by this distance and, on account of its resilient restoring force will tend to pull the edges 9 of locking tabs 7 and 8 back against thread core 10 to hold the screw in place. End 22 at the same time ensures that locking tab 8 does not bend downwardly but maintains its position approximately perpendicular to the screw plate.

What is claimed is:

1. A self-locking, sheet-metal nut comprising a generally flat thread leg having an embossed thread portion with an aperture therein for receipt of a threaded member and a pair of locking tabs resiliently and integrally connected to one end of said leg that extend over and are spaced from the aperture, said tabs being approximately perpendicular to the axis of the threaded member and having clamping edges which are directed toward each other from opposite sides of the aperture and that form an opening downstream of the aperture smaller than the core diameter of the threaded member to be threaded into the nut, wherein the tab having a clamping edge on the side of the opening opposite from said one end of said leg is connected to a pair of webs that extend past the opening and on either side of the tab nearest said end with each web being connected to said leg by an outer U-shaped connecting bend, and wherein the tab nearest said one end is connected to said leg by an inner U-shaped connecting bend, whereby upon turning of said threaded member through said aperture the clamping edges are forced apart and resiliently grip the core of the member to lock it in place.

2. The sheet-metal nut of claim 1, wherein the nearest tab and the two webs of the opposite tab are separated by slots which extend around between the inner and outer connecting bends as far as the said one end of the leg.

3. The sheet-metal nut of claim 2, wherein the width of the two webs and their outer connecting bends together is the same as the width of the nearest tab and its inner connecting bend.

4. The sheet-metal nut of claim 1, including a clip leg integrally connected to the other end of said thread leg and extending over the side of the thread leg opposite from the locking tabs and having a through hole for the threaded member in line with the aperture for securing the nut on a flat plate.

5. A self-locking, sheet-metal nut comprising a generally flat thread leg having an embossed thread portion with an aperture therein for receipt of a threaded member and a pair of locking tabs resiliently and integrally connected to one end of said leg that extend over and are spaced from the aperture, said tabs being approximately perpendicular to the axis of the threaded member and havivng clamping edges which are directed toward each other from opposite sides of the aperture and that form an opening downstream of the aperture smaller than the core diameter of the threaded member to be threaded into the nut, wherein the tab having a clamping edge on the side of the opening opposite from said one end of said leg is connected to the end by a pair of webs that extend past the opening and on either side of the tab nearest said end and wherein the tab nearest said one end is integrally connected to the webs, said webs being connected to the end by a pair of U-shaped connecting bends and being connected to the tab on the opposite side by a corrugated deflection portion and including an angled end extending down from said opposite tab that engages and supports the tab in spaced relation from the thread leg whereby upon turning of said threaded member through said aperture the clamping edges are forced apart and resiliently grip the core of the member to lock it in place.

6. The sheet-metal nut of claim 5, wherein the connecting bends have the same width as the webs.

7. The sheet-metal nut of claim 5, including a clip leg integrally connected to the other end of said thread leg and extending over the side of the thread leg opposite from the locking tabs and having a through hole for the threaded member in line with the aperture for securing the nut on a flat plate.

* * * * *